United States Patent
Yang

(10) Patent No.: US 8,907,574 B2
(45) Date of Patent: Dec. 9, 2014

(54) LED LIGHT STRING WITH OPEN CIRCUIT PROTECTION

(71) Applicant: Chen-Sheng Yang, Kaohsiung (TW)

(72) Inventor: Chen-Sheng Yang, Kaohsiung (TW)

(73) Assignee: Chen-Sheng Yang, Kaohsiung (TW)

( * ) Notice: Subject to any disclaimer, the term of this patent is extended or adjusted under 35 U.S.C. 154(b) by 37 days.

(21) Appl. No.: 13/890,456

(22) Filed: May 9, 2013

(65) Prior Publication Data

US 2014/0333218 A1    Nov. 13, 2014

(51) Int. Cl.
*H05B 33/08* (2006.01)

(52) U.S. Cl.
CPC .................................... *H05B 33/089* (2013.01)
USPC .................... 315/185 R; 315/122; 315/192

(58) Field of Classification Search
USPC .............. 315/185 R, 191, 192, 119, 122, 121
See application file for complete search history.

(56) References Cited

U.S. PATENT DOCUMENTS

| 6,597,125 | B2 * | 7/2003 | Janning | 315/185 R |
| 7,884,553 | B2 * | 2/2011 | Wada et al. | 315/185 R |
| 2008/0297058 | A1 * | 12/2008 | Soos | 315/185 R |

* cited by examiner

*Primary Examiner* — David H Vu

(74) *Attorney, Agent, or Firm* — Tracy M. Heims; Apex Juris, pllc

(57) ABSTRACT

An LED light string with open circuit protection has a first end for receiving a first voltage, a second end for receiving a second voltage, and multiple LED units connected in series between the first end and the second end. Each of the LED units has multiple LEDs and at least one by-pass resistor connected in parallel. Even when the LEDs of the same LED unit all fail, a current from the first end to the second end can still flow through all the LED units via the by-pass resistors to drive the remaining normal LED units.

6 Claims, 3 Drawing Sheets

LED LIGHT STRING WITH OPEN CIRCUIT PROTECTION

BACKGROUND OF THE INVENTION

1. Field of the Invention

The present invention relates to an LED light string, and more particularly to an LED light string capable of preventing an open circuit.

2. Description of the Prior Arts

With reference to FIG. 4, a conventional LED light string has a first end 21, a second end 22 and multiple LED units 20 connected in series between the first end 21 and the second end 22. Each LED unit 20 comprises two LEDs 201 connected in parallel.

When a forward operating voltage is applied to the first end 21 and the second end 22, all LED units 20 will be driven to emit light. However, with reference to FIG. 5, when two LEDs 201 of the same LED unit 20 are both removed from the LED light string or go wrong simultaneously, the LED unit 20 encounters an open circuit. As a result, all other LED units 20 of the LED light string are functionless.

SUMMARY OF THE INVENTION

The main objective of the present invention is to provide an LED light string with an open circuit protection, wherein the LED string is capable of preventing the occurrence of an open circuit even when all LEDs in the same LED unit all fail.

To accomplish this objective, the LED light string comprises:

a first end for receiving a first voltage;

a second end for receiving a second voltage;

multiple LED units connected in series between the first end and the second end, and each of the LED units comprising multiple LEDs and at least one by-pass resistor connected in parallel.

When any one of the LED units fails, for example, all LEDs are removed from the LED light string or go wrong simultaneously, the by-pass resistor of the failed LED unit acts as a conducting path allowing the current I to flow through the failed LED unit to the subsequent LED units. Therefore, other remaining normal LED units can still be activated to emit light and will not be affected by the failed LED unit.

DETAILED DESCRIPTION OF THE PREFERRED EMBODIMENTS

Figure 1:
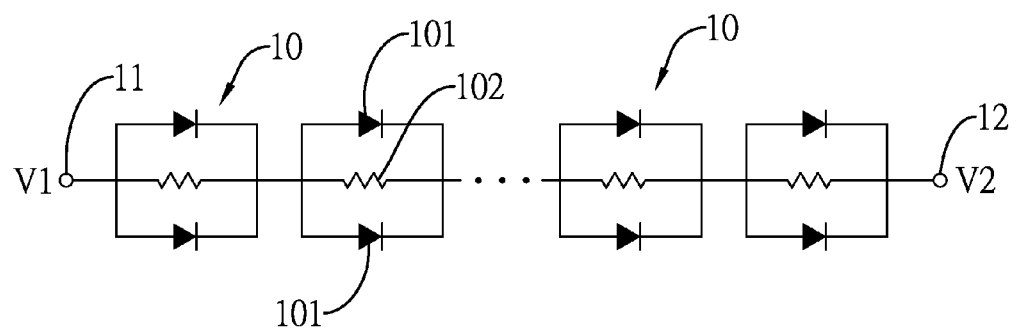
FIG. 1 is a circuit diagram of a first embodiment of an LED light string with open circuit protection in accordance with the present invention.

With reference to FIG. 1, an LED light string with open circuit protection has a first end 11, a second end 12 and multiple LED units 10. The LED units 10 are connected in series between the first end 11 and the second end 12. Each of the LED units 10 comprises multiple LEDs 101 and at least one by-pass resistor 102 connected in parallel. In this preferred embodiment, each LED unit 10 has two LEDs 101 and one by-pass resistor 102, wherein the two LEDs 101 are connected in same polarities.

All the LEDs 101 of the LED units 10 are connected in the same direction between the first end 11 and the second end 12. The first end 11 receives a first voltage V1 while the second end 12 receives a voltage V2, wherein the first voltage V1 is greater than the second voltage V2. A DC voltage is preferably applied across the first end 11 and the second 12. In the normal situation, all LEDs 101 can be activated by the voltages V1, V2 across the LED light string and a forward current I flows through the LED units 10 from the first end 11 to the second end 12.

Figure 2:
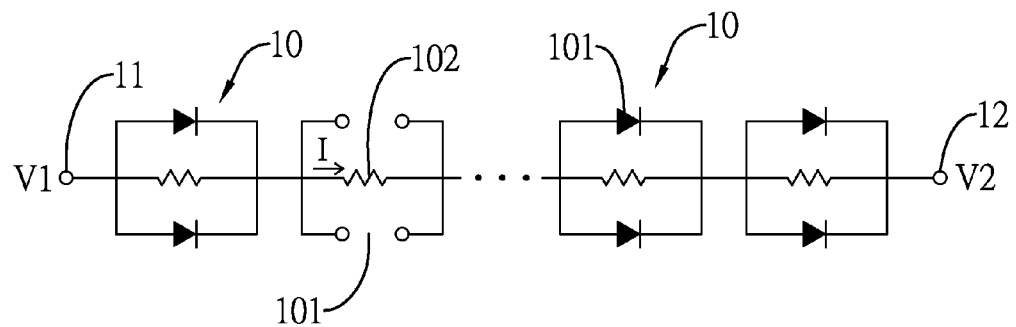
FIG. 2 is an operational circuit diagram of the LED light string of FIG. 1, wherein a current flows through a failed LED unit.

With reference to FIG. 2, when all of the LEDs 101 of the same LED unit 10 are removed from the LED light string or go wrong simultaneously, the by-pass resistor 102 provides a conducting path allowing the current I to flow through the failed LED unit 20 and to the subsequent LED units 20. Therefore, other remaining LED units 20 still can be activated to emit light and will not be affected by the failed LED unit.

Figure 3:
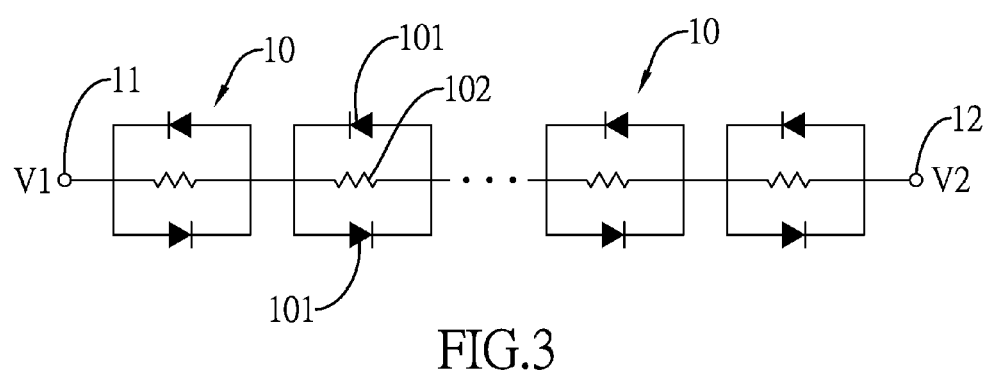
FIG. 3 is circuit diagram of a second embodiment of an LED light string with open circuit protection in accordance with the present invention.
Figure 4:
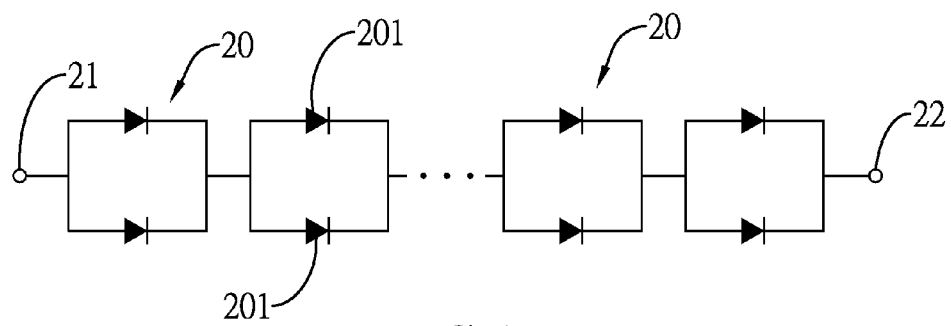
FIG. 4 is a circuit diagram of a conventional LED light string.
Figure 5:
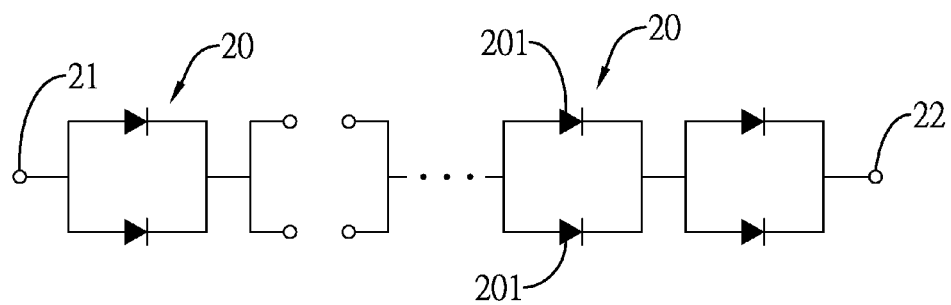
FIG. 5 shows an open circuit of the conventional LED light string.

With further reference to FIG. 3, in the second embodiment, each LED unit 10 has two LEDs 101 and one by-pass resistor 102, wherein the two LEDs 101 are connected in opposite direction, i.e. different polarities. A first DC voltage and a second DC voltages can be alternately applied across the first end 11 and the second 12 to drive the LEDs 101. For example, when the first DC voltage is applied across the first end 11 and the second end 12, and the first end 11 is higher in voltage than the second end 12, the a part of the LEDs 101 connected in a forward direction can be turned on. When the second DC voltage is applied across the first end 11 and the second end 12, and the second end 12 is higher in voltage than the first end 11, another part of the LEDs 101 connected in a reversed direction can be turned on.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An LED light string with open circuit protection, comprising:

a first end for receiving a first voltage;

a second end for receiving a second voltage;

multiple LED units connected in series between the first end and the second end, and each of the LED units comprising multiple LEDs and at least one by-pass resistor connected in parallel;

wherein a current from the first end to the second end still flows through all the LED units via the by-pass resistors even when the LEDs of the same LED unit all fail.

2. The LED light string as claimed in claim 1, wherein all the LEDs the LED units are connected in the same direction between the first end and the second end.

3. The LED light string as claimed in claim 2, wherein each of the LED units comprises two LEDs and a by-pass resistor connected in parallel, wherein the two LEDs are connected in parallel in the same polarities.

4. The LED light string as claimed in claim 1, wherein the first end receives the first voltage with a voltage level greater than a voltage level of the second voltage received by the second end.

5. The LED light string as claimed in claim 1, wherein each of the LED units comprises multiple LEDs and a by-pass resistor connected in parallel, wherein the multiple LEDs are connected in parallel in opposite polarities.

6. The LED light string as claimed in claim 5, wherein the first voltage applied to the first end has a higher level than the second voltage level applied to the second end in a first duration for turning on a part of the LEDs, and the first voltage applied to the first end is changed to have a lower level than the second voltage level in a second duration for turning on another part of the LEDs.

* * * * *